(Model.)
M. SOUTHWICK.
REMOVABLE FLOORING FOR STALLS.
No. 303,334.　　　　　　　　　Patented Aug. 12, 1884.
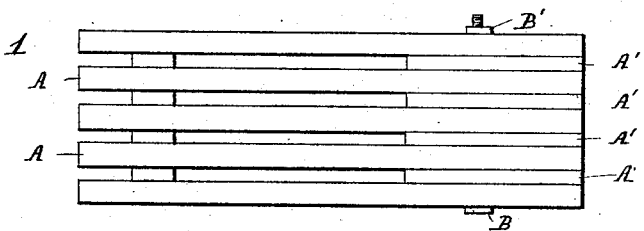
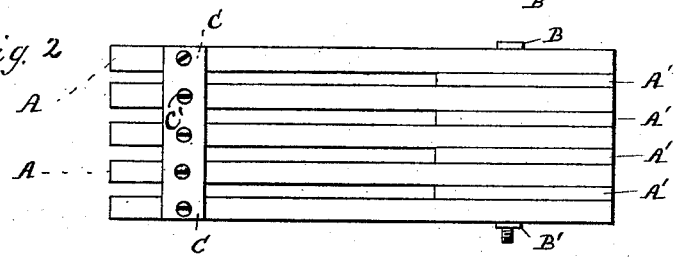
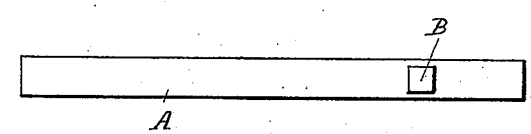
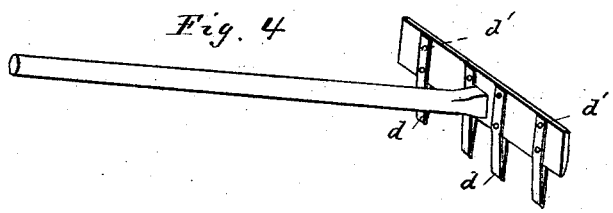
WITNESSES
Morton Toulmin
Chas M Martin
INVENTOR
Myron Southwick
Jos. H. Hunter
Attorney

United States Patent Office.

MYRON SOUTHWICK, OF PESHTIGO, WISCONSIN.

REMOVABLE FLOORING FOR STALLS.

SPECIFICATION forming part of Letters Patent No. 303,334, dated August 12, 1884.

Application filed April 1, 1884. (Model.)

*To all whom it may concern:*

Be it known that I, MYRON SOUTHWICK, a citizen of the United States, residing at Peshtigo, in the county of Marinette and State of Wisconsin, have invented certain new and useful Improvements in Removable Flooring for Stalls, of which the following is a specification, reference being had therein to the accompanying drawings.

This invention relates to improvements in removable flooring for stalls for horses or cattle, and has for its objects to furnish a bedding which will permit of easy cleaning, and also allow any moisture to pass off, and thereby keep the feet of the animal dry. These objects are attained by the devices illustrated in the accompanying drawings, forming a part of this specification, in which—

Figure 1 is a plan view. Fig. 2 is a view from the under side. Fig. 3 is a side elevation. Fig. 4 is a perspective view of the kind of rake used to clean the bedding.

The letter A indicates any suitable number of slats of rectangular form, each of which is provided with an opening for the passage of a bolt, B, having a screw-thread cut at one end, and provided with a nut, B'. Between each of the slats A is a short slat, A', which serves to keep the slats A a proper distance apart, and also to make a solid platform for the fore feet of the animal to rest upon. On the inner side of the bedding is a plate, C, preferably of sheet metal, and secured to the slats A by screws C'. By loosening the nut B' the short slats A' may be revolved upon the bolt B for the greater facility in cleaning the open spaces between the slats A. The open spaces between the slats are to permit moisture to pass off and sink below the upper surface of the bedding.

The letter D represents the rake having teeth $d$, which are intended to fit in the open spaces between the slats A, and thus afford a ready means of cleaning and keeping the bedding sweet.

The teeth $d$ of the rake are made of sheet metal, bent into a V form, so that the head of the rake will enter the V-shaped opening of each tooth, and be secured thereto by two or more rivets, $d'$.

Having described my invention, what I desire to secure by Letters Patent is—

An improved flooring for stalls, consisting of the long slats A, extending the length of the stall, the short slats A', separating said slats A at the upper end, and each provided with a central opening, the transverse bolt B, and the sheet-metal plate C, as shown and described, for the purposes set forth.

In testimony whereof I affix my signature in presence of two witnesses.

MYRON SOUTHWICK.

Witnesses:
WM. PRATT,
JARED McGRAW.